United States Patent Office 2,706,145
Patented Apr. 12, 1955

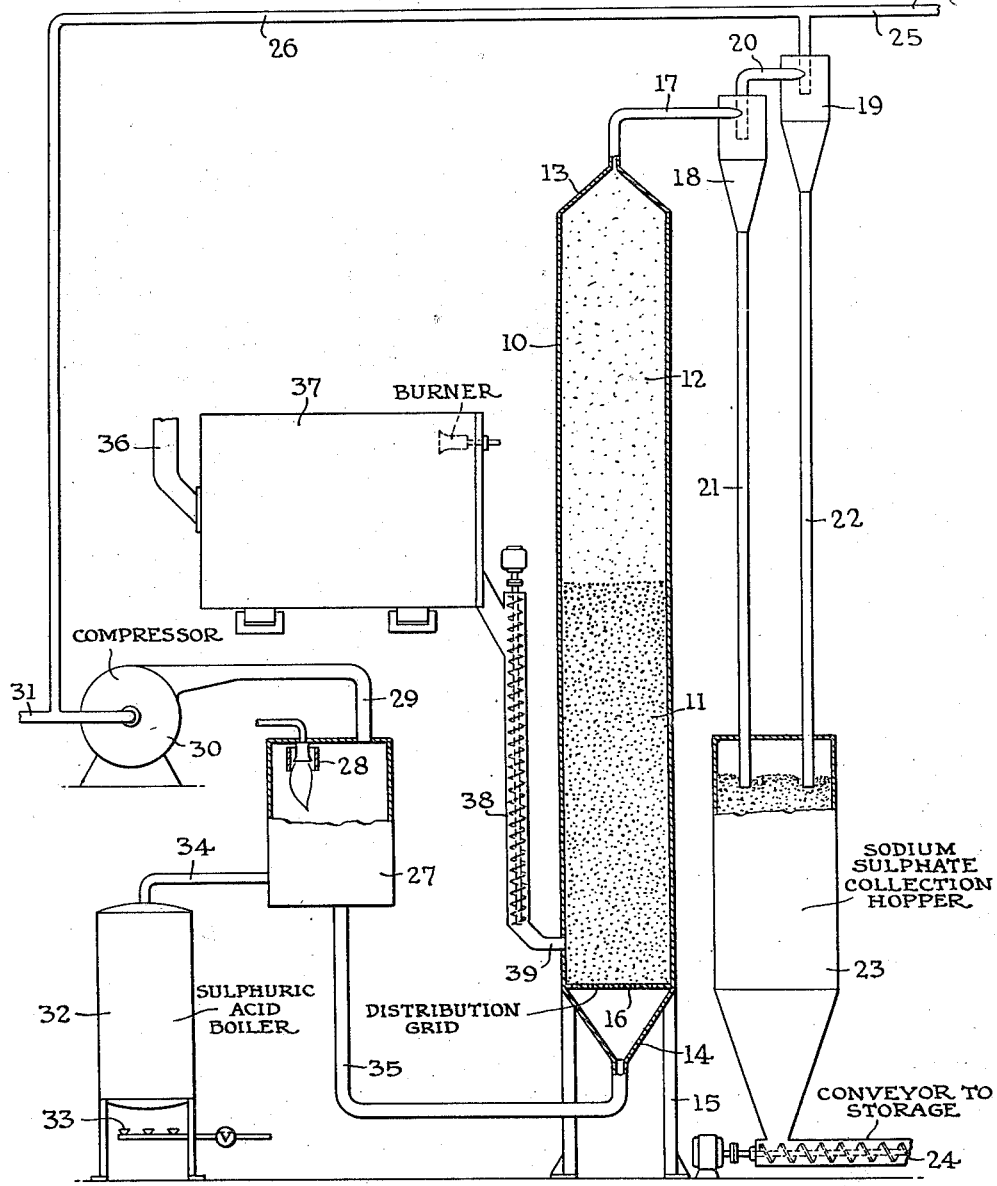

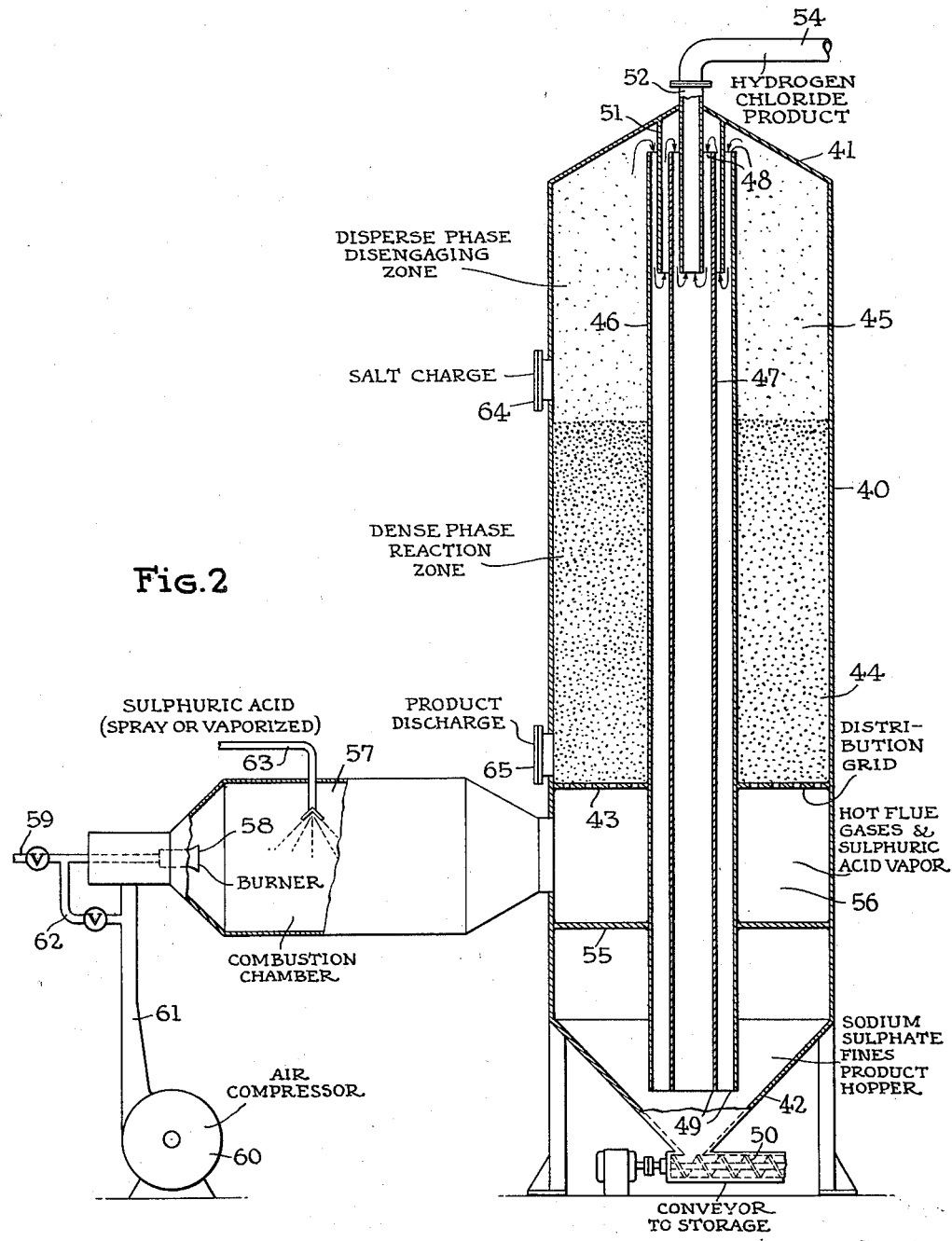

2,706,145

PRODUCTION OF SULPHATES AND HCl

Curtis W. Cannon, Denver City, Tex.

Application February 28, 1950, Serial No. 146,732

8 Claims. (Cl. 23—121)

This invention relates to an improved process and apparatus for the production of hydrochloric acid and alkali metal sulphate by the reaction of sulphuric acid upon an alakli-forming metal chloride. In particular, this invention relates to a method of effectng this reaction by maintaining a solid bed of the alkali metal chloride in an agitated state of fluidity by pressure of gases passed through the bed, and simultaneously adding sulphuric acid to the bed.

The invention is applicable to varous alkali-forming metal chlorides such as sodium, potassium, or calcium chloride. The reaction is effected at a temperature sufficiently high to produce alkali metal sulphate, such as sodium sulphate, substantially free of contaminating chloride and bi-sulphate, by effecting the reaction upon a hot granular bed maintained at optimum reaction temperature of 800° F. to 1100° F. while passing gas, such as hot inert gases, preferably containing sulphuric acid upwardly through the bed to agitate the same, maintain the same in a fluidized state in order to prevent caking thereof. In a modified procedure the sulphuric acid may be independently added to the bed.

Present successful commercial methods for reacting sulphuric acid and chloride salt are of two types. In one sulphuric acid and salt are reacted, usually in a rotary such as the Laury furnace, directly in contact with combustion gases for obtaining necessary reaction temperature. An excellent grade sulphate product is obtained but the hydrochloric product gases are considerably diluted since they mingle with the large amount of combustion gases necessary to bring the salt and sulphuric acid reagents to the 800° to 1100° F. temperature necessary for essentially complete reaction. In the other method, salt and sulphuric acid are reacted in a muffle type furnace with rotary rakes, such as the Mannheim or Bethlehem. These are expensive to build and maintain because of the moving parts in contact with corrosive material and the muffle replacements. The furnace constructon required is complicated and expensive as compared to the simple tubular type reactor necessary to accomplish conversion by the proposed method. Product gases, of course, are rich in hydrogen chloride from muffle type furnace but there is a tendency to operate in the lower zone of reaction temperature to reduce muffle replacements, which in turn yields a poorer grade salt cake. In both of the present methods stickiness and agglomeration tends to occur at certain stages of reaction which retards the reaction and require continued attention to the process.

The subject method permits the construction of greatly simplified apparatus, requiring no moving mechanical parts in contact with the corrosive reagents, eliminates the need of muffle type construction to obtain rich gases, and permits the manufacture of a uniform powder like sulphate product of high quality.

The method

According to the present invention the granular chloride salt, which is to be converted to a sulphate salt and volatile hydrochloric gas, is first preheated to reaction temperature of 800° to 1100° F. or slightly above, such as 1200° F., and reacted while being maintained in a bed turbulently agitated by the upward flow of hot gases, preferably containing the sulphuric acid as vapors, or mist, although the acid can be added as fine droplets to the top of the fluidized bed. The granular bed particles are agitated and abraded one against the next, by the gas flow, whereby the sulphuric acid mixes and reacts rapidly, forming a powderlike product without caking. The sulphate product formed as a film about each granular particle is continuously abraded therefrom, as a fine dust, which by proper selection of velocities and particle size can be selectively entrained and classified with respect to the bed by movement of gases upward therethrough. The entrained sulphate dust of high purity is carried to conventional dust collection equipment such as cyclone separators.

Thus, by the procedure described sulphate dust is abrasively removed from the reaction zone and carried by the spent reagent carrier gases above the bed and generally out side of the system, allowing in either case efficient separation of substantially pure sulphate as a dry dust, as rapidly as it is formed.

As described to this point the preferred procedure is to pass hot gases upwardly through the bed at a rate sufficient not only to agitate and abrade the sulphate formed from the salt granules but also to clasify and entrain the same by using a velocity sufficent to remove the sulphate dust outside of the system to dust separators. However, it is possible by this method to merely maintain the bed in an agitated fluid state by pressure of hot gases passing therethrough, and to add the acid independently. Thus, for example, it is possible to continuously add salt to the agitated bed and gradually add a stoichiometric quantity of sulphuric acid, to effect reaction, while maintaining the agitation by extraneous gases passed therethrough which contain no sulphuric acid. Moreover, in this latter modification, it is possible to depart from the preferred procedure to supply heat indirectly by heating the outside of the reaction chamber, while supplying agitating gases, sulphuric acid and salt thereto at either normal or raised temperature, the important feature being that the gas is passed therethrough sufficiently rapidly to maintain the bed sufficiently agitated to allow complete reaction and to prevent caking or balling of the bed. In such modification if the rate of gas passage is low such as from .1 to .3 ft. per second, it is insufficient to entrain and remove any substantial quantity of sulphate from the system.

Proceeding therefore according to the preferred practice of the present invention the salt comprising the bed material is dried if necessary and ground to the dry granular character of ordinary table salt generally having an average mesh size of about 120 or slightly larger, but screened to remove fines smaller than 100 screen mesh. The salt is then preheated by direct exchange with product gases or other conventional means and placed in a reaction chamber such as a cylindrical column with a substantial bed depth ranging from 10 to 20 feet, the chamber having an open or solid disengaging space above the bed of an additional 10 to 20 feet. The bed itself is to be considered a dense phase, or reaction zone, and the space thereabove being considered a disperse phase or disengaging zone. Hot gas is passed therethrough under sufficient pressure to raise and fluidize the granular particles, the gas being passed therethrough at a rate of a 0.1 to .3 feet per second where the reaction is to be completed without substantial entrainment. However, where the sulphate is to be entirely removed from the bed and from the disperse phase, by complete entrainment by the gas, the gas will be passed therethrough at a rate of 1 to 5 feet per second.

The reaction bed temperature may be maintained by supplying part of the fluidizing gas as hot combustion gases, but it will be found that very little heat is needed if the salt is preheated and the sulphuric acid added as a vapor; hence, the volume of inert and insoluble gases is maintained low so that the gaseous acid product remains strong, similar to muffle type furnace gases. To maintain the introduction of inert and insoluble gases to a minimum such as required when producing hydrogen chloride for organic synthesis or liquefaction the product gases can be recycled to provide sufficient fluidizing gas.

Sulphuric acid vapors for reaction can be supplied from sulphuric acid manufacturing processes, a boiler, or by spraying or vaporizing in the stream of hot fluidizing gases.

It will be appreciated that the hot reaction gases containing, for example, hydrochloric acid and entrained sodium sulphate are directly removed from the system at the high temperature of the reaction without cooling, so that no bi-sulphate is formed by cooling of the reaction product, prior to separation of the sulphate. The air compressor supplying air to maintain gas flow and pressure, generally supplies only enough air for combustion with some slight excess to regulate the temperature preventing an excessive temperature from being produced and, where the flow of gas is inadequate, hot reaction gases such hydrochloric acid containing flue gas, obtained after separation of the sulphate therefrom, may be recycled to the combustion chamber for building up the flow rate of the gases therethrough to a desired rate, as stated above.

Various composition granular materials within the limits above stated are useful bed components. Thus as indicated, where sodium chloride forms the bed, the components comprising the reaction products of sulphuric acid thereon are sodium sulphate and hydrochloric acid. For the same general type of product, the bed may be calcium chloride to produce calcium sulphate and hydrochloric acid, or potassium chloride to produce potassium sulphate and hydrochloric acid.

*The apparatus*

Reference is made to the drawings herewith to show apparatus for effecting this process batchwise or continuously wherein:

Figure 1 shows, diagrammatically, a system for producing sulphate dust and acid gas continuously; and Figure 2 shows a system for producing sulphate dust and HCl gas batchwise.

Thus, referring to Figure 1 a vertical cylindrical column 10 comprising a reaction vessel, has a reaction salt bed 11 in the lower portion thereof constituting a dense phase, and an open space 12 thereabove, constituting a disperse phase or disengaging zone, the reaction vessel being closed at the top 13 by any pressure resistant curved shape, shown as conical, and closed at the bottom 14 by pressure resistant curved shape such as conical, mounted on legs 15 for support thereof. The fluidized bed 11 is supported upon a perforated grid plate 16 constituting a distribution grid for supporting the bed, and supplying gas thereto through its several perforations. The reaction products are carried overhead through top 13 by way of a pipe 17 to dust separators 18 and 19 connected in series through a line 20. The dust separated flows by gravity through legs 21 and 22 to any suitable hopper 23 for collecting separated sulphate dust and conveying the same by a conventional screw conveyor 24, to storage. The collection hopper 23 is suitably sealed at the junction with legs 21 and 22 as well as by conveyor 24, in order to prevent effluence of reaction gases, under pressure, at these points. The acid-containing reaction gases after removal of dust in the separators 18, 19, is passed through line 25 to acid washers or absorbers of conventional construction (not shown); or, part thereof may be re-cycled through line 26 to maintain pressure and adequate fluidity in the reaction vessel.

Flue gases for maintaining reaction temperature are produced in a combustion chamber 27 by combustion of a suitable fuel introduced to a burner 28. Air for combustion is supplied from a compressor 30 through a line 29 leading directly to the combustion chamber 27. Gases to the compressor 30 are drawn from the outside air through a line 31 or a portion thereof may be drawn from line 26, as re-cycled hot reaction gases for maintenance of a desired rate of flow in the system. Sulphuric acid is preferably added in a dispersed or vaporous state such as directly from a sulphuric acid process, by spraying, or as shown, from a sulphuric acid boiler 32 heated by burners 33; and the gases thence passed through a line 35, to the bottom of reaction vessel 10, and thence upwardly through the distribution grid 16 into the bottom of the salt bed for heating and reaction with the salt.

For continuous operation fresh granular salt, cold or previously preheated by direct exchange (not shown) with product gases is supplied into feed line 36 and thence into a preheating, preferably direct-fired, kiln 37 and thence to any suitable salt feeder such as a screw conveyor 38, and finally through a line 39 into the bed preferably at a point near the bottom for continuous replenishment at the salt bed as the same is consumed in the reaction.

Thus for operation of the continuous device shown in Figure 1 the bed is first established in the chamber 11 of a suitable height such as 15 feet, and filled with the dry granular material such as salt. The salt bed is then preheated by merely operating burner 28 and compressor 30 to heat and maintain the bed fluid by rapid abrasive movement of the fine particles agitated by the gas passed upwardly therethrough, at a suitable rate such as 2 feet per second. After preheating to the range of 800° F. to 1200° F., the sulphuric acid vapor produced in still 32 is then added to the flue gases in combustion chamber 27 and carried thereby into reactive contact with the preheated fluidized bed to form acid gas, such as hydrochloric acid, and sulphate film such as sodium sulphate about each salt particle of the bed. The abrasive action of the fluidized particles of the bed continuously abrade sulphate dust which is carried upwardly, entrained by the gas, into the separators where the sulphate dust is removed from the hot gases without cooling, the sulphate being removed to storage through legs 21 and 22. At least part of the gas is carried to acid absorbers or acid recovery apparatus and part of the gas necessary to maintain the desired rate of flow of 1 to 5 feet per minute is re-cycled through line 26 to the compressor 30. As the bed is used up, it is continuously replenished by fresh preheated salt, added to the bed through line 39, after preheating in kiln 37.

For batchwise operation reference is made to Figure 2 showing a vertical cylindrical reaction column 40 having a pressure-resistant curved or conical top 41 and conical bottom 42. An intermediate perforated plate 43 is mounted horizontally of the cylindrical column 40 and forms a distribution grid for passing reaction gases into the bed 44. As in Figure 1 the bed itself constitutes a dense phase reaction zone 44 above which is a disperse phase or separating zone 45. Centrally mounted in the cylindrical reaction column 40 is a tubular duct 46 and, concentric therewith, is tubular duct 47 of smaller diameter, both tubular ducts being open at the top 48 close to the reaction chamber top 41. The said tubes 46 and 47 are likewise open at the bottom 49, close to the curved bottom 42 of the reaction column, to communicate therewith. The bottom of the reaction column is preferably conical or hopper shaped for collection of sulphate dust and communicates with any suitable conveyor device 50, for removal of collected fines therein, while maintaining the system sealed against effluence of reaction gases in the system under pressure. Third and fourth tubular members 51 and 52 depend from the top 41 of the reaction chamber to fit concentrically into the tubes 46 and 47, and alternate therewith, as to form a series of concentric tubular baffles, the outermost of which communicates directly with the reaction chamber as shown by the arrows. Thus a baffle type, dust collecting system is defined in the top of the cylindrical column comprising a series of concentric tubular baffles, the gas and entrained sulphate dust passing from the reaction chamber into a labyrinth from the top of the open tube 46 to the bottom dependent tube 51, thence to the top of the inner tube 47, and finally upward after removal of sulphate dust by the baffling action thereof. The cleaned, dust-free reaction gases pass out through gas duct 54 which leads acid reaction gases to washers and acid absorbers (not shown) for conventional recovery thereof.

The separated sulphate dust will deposit concentrically within the tubes 46 and 47, in this two-stage tubular type dust eliminator described, and will eventually collect in the hopper bottom 42 for removal to storage. Intermediate the conical bottom 42 and the distribution grid 43, is a parallel, horizontally mounted, sealing plate 55 which seals the hopper-like bottom from the rest of the column allowing communication thereof only with upper tubes 46 and 47. Said sealing plate 55 defines a hot gas distribution chamber 56 between said plate and the distribution grid 43. Communicating with said chamber 56 is a combustion chamber 57 having a burner 58 for production of hot combustion or flue gases and means to supply fuel thereto by a pipe 59. Air compressor 60 for supplying air under pressure and at the required rate is provided, supplying air either or both to the combustion chamber and to the burner, through parallel lines 61 and 62. Sulphuric acid which may be preheated as a spray, or completely vaporized in a burner, such as 32 of Figure 1, is supplied through a line 63 directly to the combustion chamber. In the reaction column 40 suitable charging and discharging doors 64 and 65 may be provided in the column for bathwise operation.

For operation batchwise as shown in Figure 2 the sulphate dust formed, after first preheating the bed 44, is trapped in the concentric tubular dust eliminators formed by the several tubes 46, 47, 51 and 52 and deposited in the conical hopper at the bottom of the column from whence the sulphate dust is removed for storage. The acid gas passes from the concentric baffles as a substantially clean sulphate-free gas containing acid and thence to an acid recovery or washing system. The combustion chamber supplying hot reaction gases or hot preheating gases is similarly operated by burning the gases in a burner, maintained under pressure by an air compressor, and supplied with sulphuric acid spray or vapor for conveyance to the reaction bed. The operation again being maintained at a rate sufficient to fluidize the bed and abrade sulphate particles as formed.

It will be appreciated in the process as described herein that neither sulphate nor salt used in the original starting material is fused either in the preheating or cooling thereof, but rather the bed is preheated prior to conveyance of sulphuric acid thereto, and maintained in a dry granular turbulent state by passage of gas therethrough, while the reaction takes place. Similarly the sulphate formed is never fused but is abraded and carried overhead to be removed in dust collectors as formed. The reaction products are not cooled within the system so that the reaction of sulphuric acid is never reversed to form bi-sulphate by reaction of the sulphate with acid, as may happen at reduced temperatures.

The sulphate formed is not only unfused but is nonvolatile, and is entrained as a dust in the reaction gases. For this reason the sulphate is substantially of the degree of purity of the salt from which it is derived. It is possible therefore to mix the salt with various substances which are desirably entrained with the sulphate. For example, where the sulphate is an intermediate product to be used in further processing, it may be desirable to mix the salt bed with a catalyst to be carried in a powdered state overhead with the sulphate. Conversely, where a sulphate of high degree of purity is desired it is possible to preliminarily purify the original salt prior to forming the same into the bed.

It will be understood that the term salt, as used herein, is intended to be generic to the various alkali-forming metal chlorides useful to form respective sulphates in an unfused state, and volatile hydrochloric acid. The present method involves preheating the salt to reaction temperature, introducing the sulphuric acid, preferably as vapor, agitating the bed by the passage of the gas violently enough to abrade the particles, and re-cycling hot hydrochloric gases for bed agitation, involving great simplification of existing process and apparatus.

The present method will be appreciated to have a number of outstanding advantages. Among these is that the method, wherein the bed is maintained in a fluid state by agitation by reaction gases passing therethrough. The bed is not fused, thus eliminating much manipulative handling, grinding and breaking up of caked products as his necessary in typical salt cake furnaces, such as direct fired rotary furnaces or mechanical rake processes, well known in the art. Thus, the present method is adapted either to continuous or batchwise operation with great saving of wear and replacement of expensive equipment necessitated by mechanical manipulation thereof, under highly corrosive conditions. The apparatus herein, lending itself to great economy of operation, may be constructed of expensive or inexpensive materials depending upon the requisite purity of the products. Thus, the apparatus may be constructed of corrision resistant alloy metal or of ferrous metal lined with ceramic lining materials. The more expensive equipment is justified in view of the great economy of operation, made possible by this invention.

Finally, it is pointed out that the bed, continuously preheated and heated in operation by combustion gases, may be supplied with any desired degree of heat, by variation of the quantity of fuel supplied to the burners. For this reason it is possible not only to supply preheated salt in a continuous operation, but such salt need not be originally granular but may itself be supplied as a brine slurry or solution in water, if the same is soluble, the burner being adjusted to supply the excess heat requisite for evaporation of moisture therefrom in the bed.

In batchwise operation, of course, the bed will be replenished, periodically with fresh salt, and preheated in the column 40 by passing ordinary combustion gases therethrough, until reaction temperature is reached, prior to the addition of sulphuric acid thereto.

The following examples illustrate specific products that may be formed by the present method:

*Example I*

A bed of dry granular sodium chloride is established as shown in Figure 1 in a vertical column to a depth of approximately 12 feet. Flue gas, formed by burning gaseous fuel, is passed therethrough at a velocity of about two feet per second to effect fluidizing agitation of the bed and preheating the same to a temperature of 1150° F. Thereafter vapors of sulphuric acid are added to the gas and passed simultaneously therewith through the bed. Sodium sulphate is formed as a dust and collects in dust separators and, as the bed is reduced, as a result of the reaction, additional granular salt is added to the bed, after first preheating the same in a small kiln at a rate sufficient to maintain the depth of the bed constant at 12 feet. After substantial evolution of hydrochloric acid has begun a portion thereof may be re-cycled to the combustion chamber and the amount and quantity of gases produced by combustion are reduced to about 25% of the original. The balance of re-cycled gas with freshly produced flue gas being in a ratio to produce evolved gas containing approximately 50% of hydrochloric acid after dust separation. Sodium sulphate produced is of fine dust-like character consisting of 97.5% sodium sulphate.

*Example II*

A bed of dry granular sodium chloride is established in a column as described in Figure 2, to a depth of 12 feet. The burner and air compressor are started and hot flue gases are passed upwardly through the bed at a rate of about 1 ft. per second whereby the sodium chloride granules are agitated but not entrained sufficiently to carry the same out of the disperse phase above the bed which is an open space above the bed approximately 10 feet in height. The gases are passed through the bed until a temperature of 1200° F. is reached. Thereafter a fine spray of sulphuric acid, preheated to the boiling point, is added to the combustion chamber so as to be entrained by the combustion gases. Sodium sulphate begins to be formed in the bed and the effluent gases will contain evolved hydrochloric acid generally variable with sulphuric acid supplied. In this case the rate is adjusted to produce a hydrochloric acid content in the reaction gases in proportions of about 50%. The sulphate will be abraded from the granules of sodium chloride and carried upwardly as a fine dust to be separated in a dust collector comprising the concentric tubular baffles from whence it settles to the bottom of the reaction column in the hopper. After sodium sulphate comes over, sufficient is allowed to collect in the hopper 42 to form a seal above the bottom of the tube, and thereafter the conveyor is started and operated at a rate to maintain a gas seal in the hopper. The acid gases passing overhead are passed to gas washers for removal of hydrochloric acid. After the height of the bed has been reduced considerably by exhaustion of sodium chloride to substantially less than half the original height, the acid spray and burners are cut off, the unit is allowed to cool. The residue of the bed is removed through a discharge opening in the column and the bed is replenished by fresh salt charged in at the top. For the operation described, the sodium sulphate obtained is about 95% pure, whereas the bed components, per se, comprises at least 90% of granular sodium chloride, illustrating that the sodium sulphate is separated as a relatively pure product in the presence of sodium chloride. However, the sodium sulphate contains the same impurities in substantially the same degree that the sodium chloride originally had.

Various chloride salts may be treated to convert the same to acid and sulphate using the present fluidized bed method within the principles outlined above and it is intended that the foregoing description and examples be regarded as exemplary and not limiting, except as defined in the claims.

I claim:
1. The method of converting a chloride of a metal selected from the group consisting of sodium, potassium and calcium to a metal sulphate and selected from the group consisting of sodium, potassium and calcium and hydrochloric acid comprising: forming a hot granular bed of said metal chloride maintained in the temperature range of 800° F. to 1100° F.; continuously passing hot gases containing sulphuric acid vapors upwardly through the bed at a rate of approximately 1 to 5 feet per second to turbulently agitate the same and selectively abrasively remove and entrain abraded fine sulphate dust formed by reaction of said granules of metal chloride with said vapors from an upper portion of the reaction bed; continuously adding fresh metal chloride preheated to reaction temperature to the bed to replenish the same as it is reacted; continuously separating entrained sulphate dust from the reaction gases prior to cooling; and re-cycling a portion of the hot hydrochloric acid-containing gases produced in the reaction to the bottom of the bed.

2. A continuous process of producing metal sulphate selected from the group consisting of sodium, potassium and calcium from metal chloride selected from the group consisting of sodium, potassium and calcium comprising forming a reaction zone of a fluidized bed of finely divided metal chloride particles by passing gases containing vaporized sulphuric acid upwardly therethrough at a rate of approximately 1 to 5 feet per second, maintaining said bed at elevated reaction temperature whereby said gases react with said particles to form metal sulphate reaction product on the surface of said particles, the rate of passage of said gases producing substantial abrasive contact of one particle with the next to selectively abrade and separate said reaction product from said particles and selectively entrain and remove abraded reaction product from an upper portion of said reaction zone as a fine dust, heating additional metal chloride particles to reaction temperature outside of said reaction zone, separately heating additional sulphuric acid to reaction temperature outside of said reaction zone and introducing said heated chloride particles and heated sulphuric acid into said reaction zone.

3. The process in accordance with claim 2 where the metal chloride is sodium chloride.

4. The method of reacting metal chloride selected from the group consisting of sodium, potassium and calcium with sulphuric acid to produce metal sulphate selected from the group consisting of sodium, potassium and calcium comprising fluidizing a bed of finely divided metal chloride at elevated reaction temperature by passing hot gases containing vaporized sulphuric acid upwardly therethrough at a rate of approximately 1 to 5 feet per second whereby said sulphuric acid reacts with said chloride to produce metal sulphate reaction product on the surface of said chloride, the rate of passage of said gases producing substantial abrasive contact of one particle with the next to selectively abrade, entrain and remove said reaction product from an upper portion of said bed as a fine dust.

5. The method in accordance with claim 4 where the metal chloride is heated to reaction temperature prior to entering the fluidized bed.

6. The method as defined in claim 4 wherein at least a portion of the gases evolved from the fluidized bed are recycled in admixture with said gases passing upwardly therethrough.

7. The method as defined in claim 4 wherein the metal chloride is about 100 to 120 mesh particle size.

8. The method of reacting metal chloride selected from the group consisting of sodium, potassium and calcium with sulphuric acid to produce metal sulphate selected from the group consisting of sodium, potassium and calcium comprising fluidizing a bed of finely divided metal chloride at elevated reaction temperature by passing hot gases containing vaporized sulphuric acid upwardly therethrough at a rate of approximately 1 to 5 feet per second whereby said sulphuric acid reacts with said chloride to produce metal sulphate reaction product on the surface of said chloride, the rate of passage of said gases producing substantial abrasive contact of one particle with the next to selectively abrade, entrain and remove abraded reaction product from an upper portion of said bed as a fine dust, the metal chloride being preheated to approximately reaction temperature prior to entering the fluidized bed and where at least a portion of the gases withdrawn from the fluidized bed is recycled in admixture with the gases passing upwardly through the fluidized bed.

References Cited in the file of this patent

UNITED STATES PATENTS

| Number | Name | Date |
|---|---|---|
| 149,859 | Hargreaves et al. | Apr. 21, 1874 |
| 1,984,380 | Odell | Dec. 18, 1934 |
| 2,012,098 | Haase et al. | Aug. 20, 1935 |
| 2,336,180 | Lippman et al. | Dec. 7, 1943 |
| 2,422,501 | Roetheli | June 17, 1947 |
| 2,488,029 | Scheineman | Nov. 15, 1949 |
| 2,488,031 | Gunness | Nov. 15, 1949 |
| 2,548,642 | White | Apr. 10, 1951 |
| 2,561,394 | Marshall | July 24, 1951 |
| 2,596,954 | Heath | May 13, 1952 |
| 2,600,253 | Lutz | June 10, 1952 |
| 2,625,464 | Roberts et al. | Jan. 13, 1953 |

FOREIGN PATENTS

| | | |
|---|---|---|
| 513,947 | Great Britain | Oct. 26, 1939 |

OTHER REFERENCES

Cumming, Hydrochloric Acid and Salt Cake, vol. 5, 1923, pages 198–203, D. Van Nostrand Co., New York.